United States Patent [19]

Sanekata

[11] 4,314,403
[45] Feb. 9, 1982

[54] MACHINE FOR AUTOMATICALLY STACKING PLATE GROUPS FOR STORAGE BATTERIES

[75] Inventor: Nobuo Sanekata, Takatsuki, Japan

[73] Assignee: Yuasa Battery Company Limited, Takatsuki, Japan

[21] Appl. No.: 97,482

[22] Filed: Nov. 26, 1979

[30] Foreign Application Priority Data

Jun. 9, 1977 [JP] Japan ................................ 52-68547

Related U.S. Application Data

[63] Continuation-in-part of Ser. No. 882,392, Mar. 1, 1978, abandoned.

[51] Int. Cl.³ ............................................ B23P 19/04
[52] U.S. Cl. ........................................ 29/730; 29/786; 29/809; 198/421; 198/422; 226/97; 29/623.2
[58] Field of Search ....................... 29/730, 623.1, 782, 29/786, 809, 623.2; 198/422, 421; 53/540; 226/97

[56] References Cited

U.S. PATENT DOCUMENTS

| 1,669,999 | 5/1928 | Olsen | 83/346 |
|---|---|---|---|
| 2,324,523 | 7/1943 | Lund | 29/730 |
| 2,523,910 | 9/1950 | Lund | 29/730 |
| 2,565,868 | 8/1951 | Mann et al. | 29/730 |
| 2,577,915 | 12/1951 | Pillar et al. | 226/97 |
| 2,624,106 | 1/1953 | Lund | 29/730 |
| 2,680,510 | 6/1954 | Donath | 29/730 |
| 2,830,692 | 4/1958 | Winkel | 29/786 |
| 2,897,950 | 8/1959 | Reed | 198/421 |
| 3,514,024 | 5/1970 | Hawkins | 226/97 |
| 3,799,321 | 3/1974 | Agui | 198/419 |
| 3,900,341 | 8/1975 | Shoichiro et al. | 29/623.2 |
| 4,026,000 | 5/1977 | Anderson | 29/730 |
| 4,080,727 | 3/1978 | Stolle et al. | 29/730 |
| 4,080,732 | 3/1978 | Eberle | 29/730 |

Primary Examiner—Daniel C. Crane
Attorney, Agent, or Firm—Watson, Cole, Grindle & Watson

[57] ABSTRACT

The invention relates to a machine for automatically stacking plate groups for storage batteries. It comprises a plate separating means of separating plates one by one from a hopper and delivering them to the next step, a separator supplying means of supplying separators so as to rectangularly cross the delivered plates, a separator sealing means of sealing the side portions of the separators folded into two and coating the plates, a plate group unit assembling means for overlapping the plates coated with the separator with the opposite plate so as to be a unit, a plate group block assembling means for stacking a predetermined number of plate group units so as to be a block and a conveying means of conveying the plate group blocks to the next step and the respective means are so formed as to be operatively connected with one another.

The present invention has an advantage that a storage battery plate group consisting of many positive and negative plates and separators can be assembled so quickly and efficiently that the human labor can be omitted and the cost reduction of the products can be expected.

6 Claims, 20 Drawing Figures

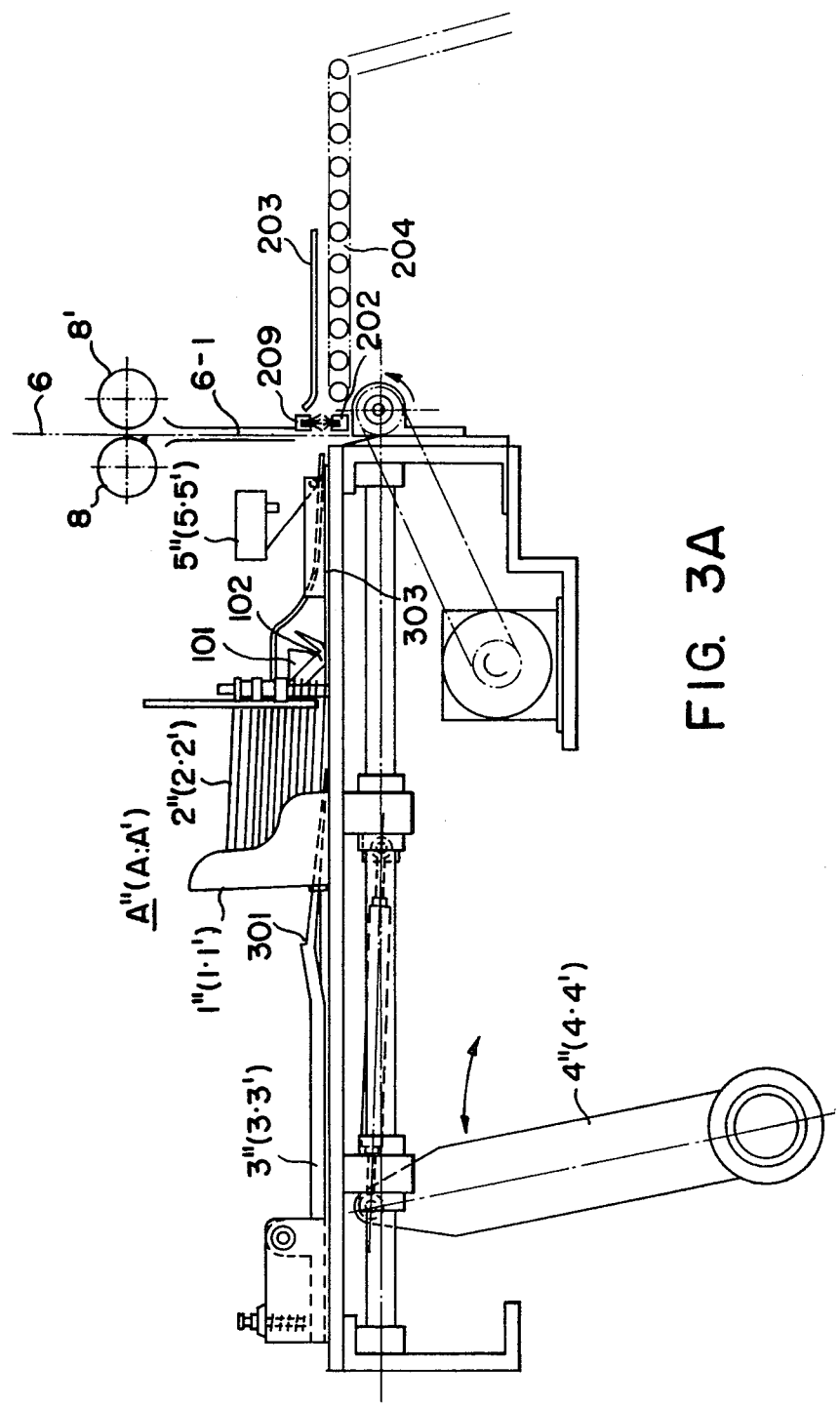

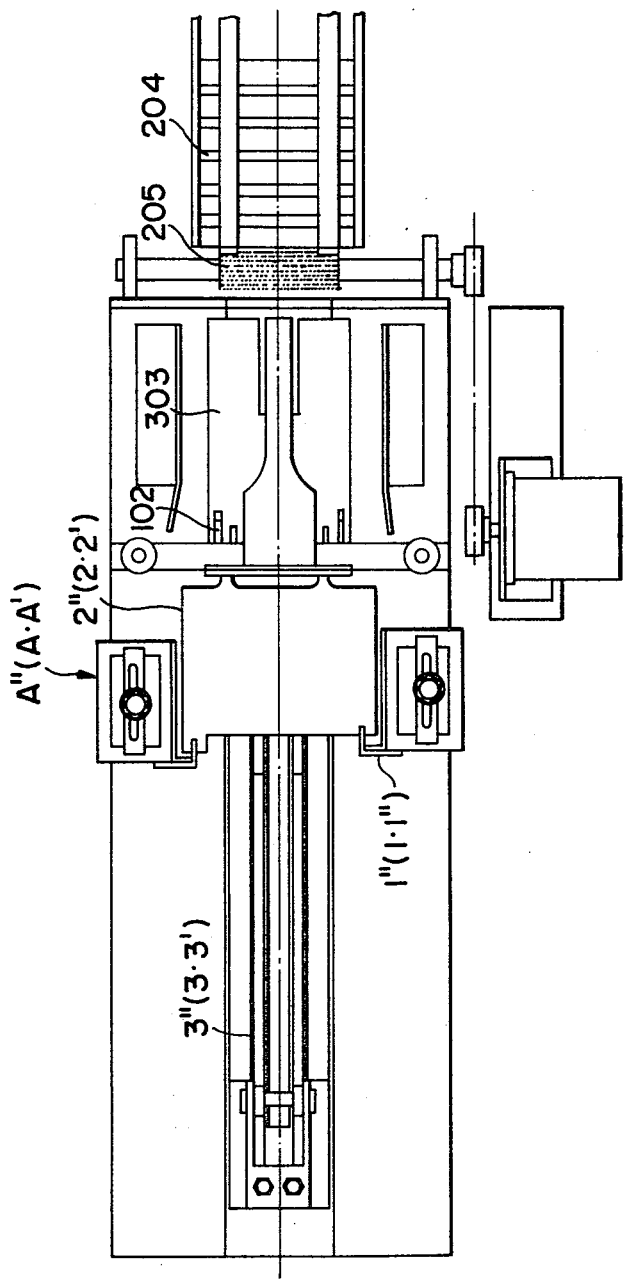

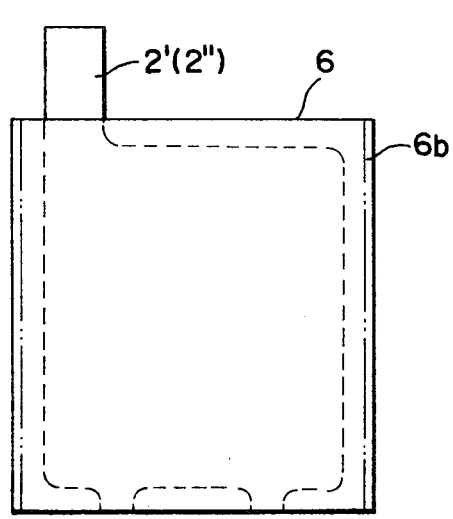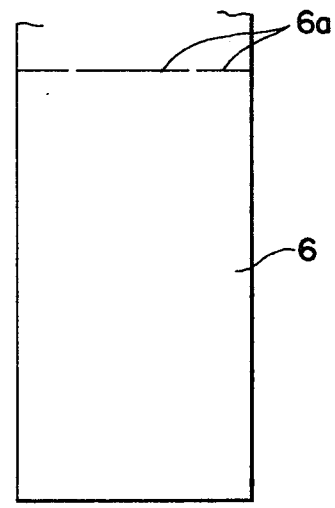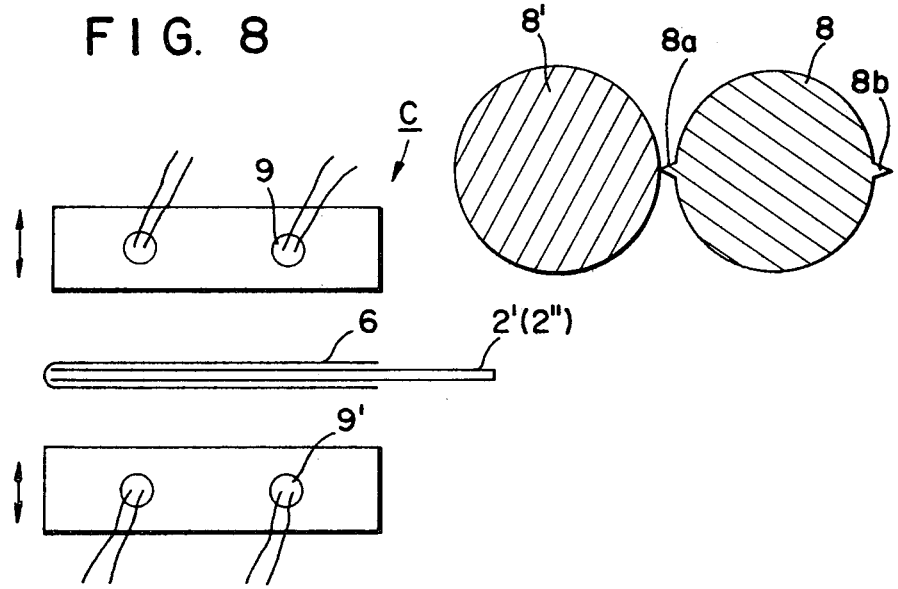

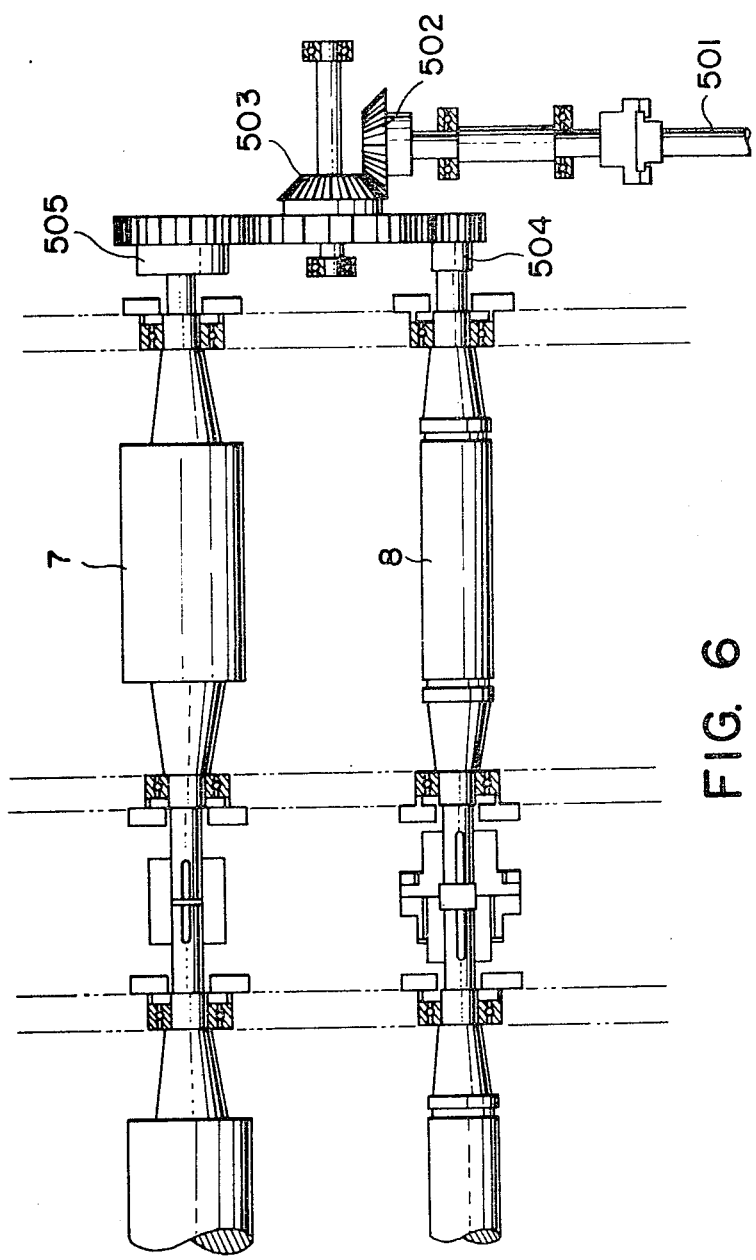

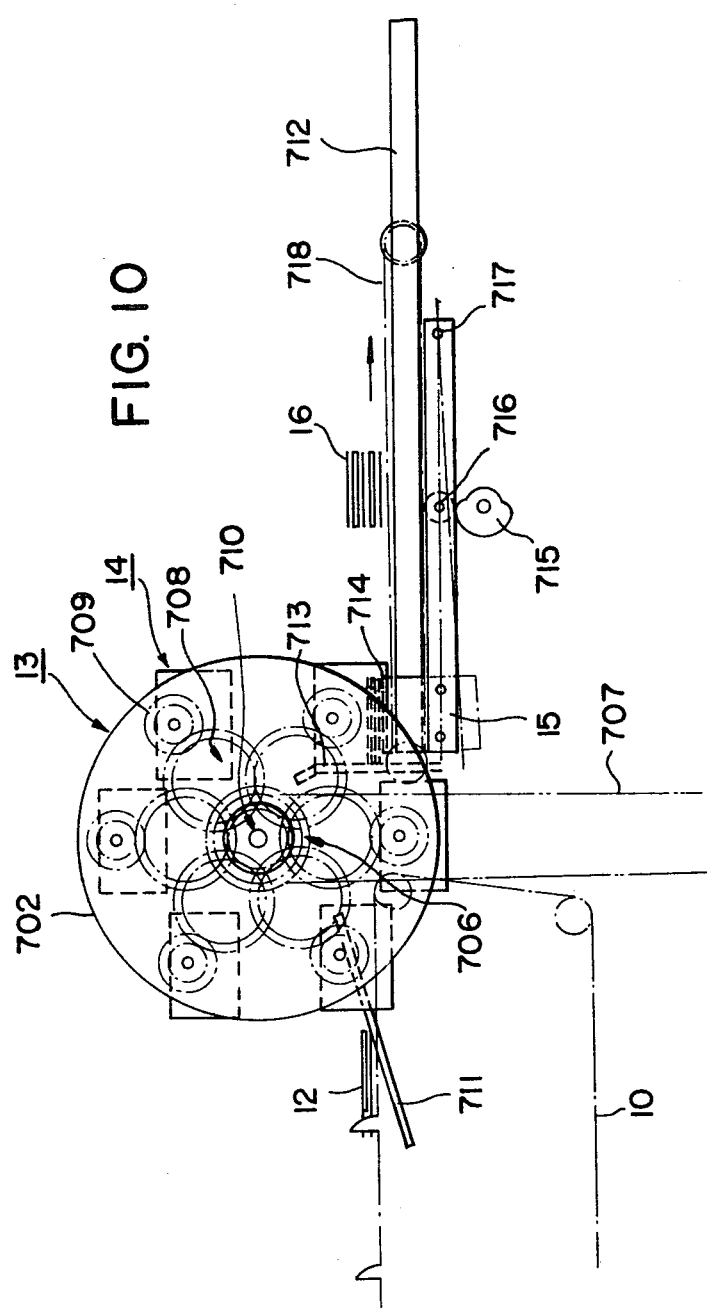

MACHINE FOR AUTOMATICALLY STACKING PLATE GROUPS FOR STORAGE BATTERIES

This application is a continuation-in-part of Ser. No. 882,392, filed Mar. 1, 1978, now abandoned.

BACKGROUND OF THE INVENTION

1. Field of the Invention

The present invention relates to storage battery machines and more particularly to an improved machine for automatically stacking storage battery plate groups.

2. Description of the Prior Art

It is already suggested to automatically stack a required number of positive and negative plate and separators into a plates group by mechanically stacking them as, for example, in U.S. Pat. Nos. 3,799,321 and 3,900,341. However, there has been defects that, in case thin separators are used, the positive and negative plates and separators will not be able to be accurately arranged and will be therefore stacked as unarranged to give defective products, to require human labor to manually correct the unarrangement and to increase the cost of the products.

SUMMARY OF THE INVENTION

The present invention overcomes all of these defects.

The first object of the present invention is to provide a novel machine for automatically stacking plate groups for storage batteries wherein many positive and negative plates and thin separators are automatically and quickly made into plate groups.

Another object of the present invention is to provide a novel machine for automatically stacking plate groups for storage batteries wherein respective component means are mechanically integrally combined as operatively connected with one another.

A further object of the present invention is to provide a machine for automatically stacking plate groups for storage batteries which is so high in efficiency that the reduction of the cost of the products can be expected.

Further objects, advantages and features of the present invention will become more fully apparent from a detailed consideration of the arrangement and construction of the constituent parts as set forth in the following specification taken together with the accompanying drawings.

BRIEF DESCRIPTION OF THE DRAWINGS

FIG. 3A is an enlarged side view of a plate separating means.

FIG. 3B is a plan view of the plate separating means of FIG. 3A.

FIG. 4 is an enlarged elevation showing a part of a separator.

FIG. 5 is an enlarged sectional view of a roll cutter.

FIG. 6 is an elevation showing a mechanism of a roll cutter part (station B).

FIG. 7 is an enlarged elevation of a plate covered with a separator.

FIG. 8 is an enlarged side view of a separator sealing means.

FIG. 10 is a side view of a rotating means (station E).

DETAILED DESCRIPTION OF PREFERRED EMBODIMENTS

Figure 1:
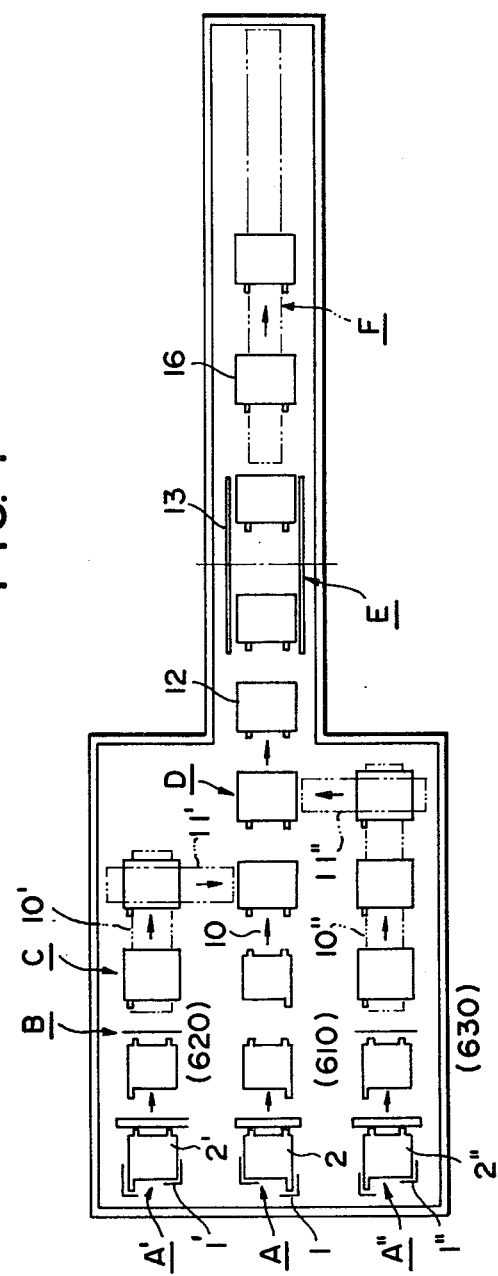
FIG. 1 is a plan view of a machine for stacking plate groups for storage batteries of the present invention.
Figure 2:
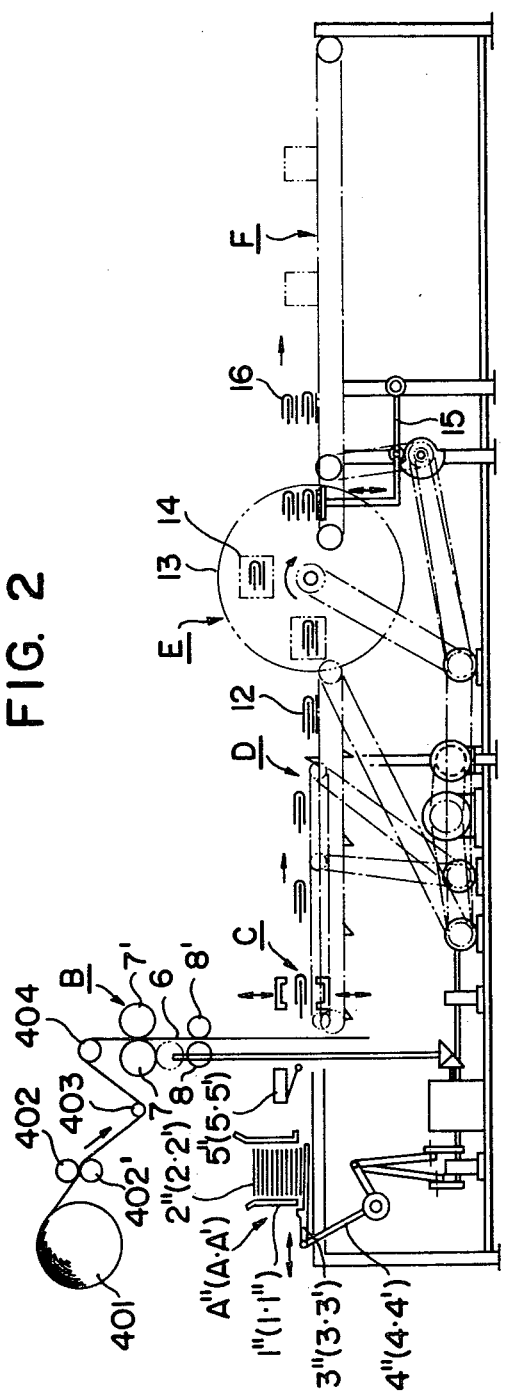
FIG. 2 is a side view of the same.

In FIGS. 1 and 2, symbols A, A' and A" indicate respective plate separating means formed respectively of hoppers 1, 1' and 1", separating plates 3, 3' and 3" and rocking levers 4, 4' and 4" as shown in FIG. 3. Plates 2, 2' and 2" are contained as stacked respectively in the hoppers 1, 1' and 1". In this embodiment, the reference numeral 2 indicates a negative plate and 2' and 2" indicate positive plates. The positive plates 2' and 2" and negative plate 2 are opposite plates to each other. The separating plates 3, 3' and 3" are provided respectively below the hoppers 1, 1' and 1", are two-stepped and are reciprocated respectively by the rocking levers 4, 4' and 4".

Reference numerals 5, 5' and 5" indicate such respective stopping elements for immediately stopping the entire machine in case the plates 2, 2' and 2" cannot be separated from the plate separating means as, for example, limit switches, proximity switches, photo-switches or air sensors.

Symbol B indicates a separator supplying means formed of a pair of transferring rollers 7 and 7' for vertically transferring a separator 6 supplied from a taking-up roller and a pair of roll cutters 8 and 8'. Further, a plurality of pairs of air feeders (not illustrated in FIG. 2, but illustrated in detail in FIGS. 13 and 14) utilizing compressed air may be provided in positions adjacent to the separator 6 in front and rear of the pair of transferring rollers 7 and 7' or the pair of roll cutters 8 and 8'. In such case, the separator 6 will be effective to prevent wrinkles and shrinks from being produced while it is being supplied.

The separator 6, a thin microporous sheet, is, for example, of a special embossed sheet made of a microporous sheet containing a synthetic resin or of a nonwoven or woven fabric of fine synthetic fibers of a diameter less than 5 microns and is of a thickness less than 0.5 mm. Reference numeral 6a indicates one of slits provided at predetermined intervals by leaving connecting parts about 0.2 to 0.5 mm long to make it easy to cut off the separator as shown in FIG. 4. A pair of roll cutters 8 and 8' are shown in FIG. 5. Particularly the roll cutter 8 has a cutting edge 8a for making the slit 6a in the upper part of the separator 6. Two of such cutting edges can be provided. In such case, one of the cutting edges can be provided. In such case, one of the cutting edges is used to make a slit for making it easy to cut off the separator and the other cutting edge is used to make a perforated line for making it easy to bend the separator.

Symbol C indicates a separator sealing means consisting of a pair of heating elements containing cartridge heaters 9 and 9'. It is used to continuously or partly seal the side portions of the separators 6 coating the plates.

Reference numeral 6b indicates a sealed part as shown in FIG. 7. Further, the heating elements are so made as to be able to freely adjust the temperature in response to the variations of the material of the separator to be used and the production speed. In this embodiment, the sealing by heating has been described but the sealing with a binder can be also applied.

Symbol D indicates a plate group unit assembling means formed of transferring elements 10, 10' and 10" consisting of chain conveyers and laterally moving elements 11' and 11". Both elements are operatively connected with each other to assemble a plate group unit 12 by overlapping the plate 2' or 2" coated with the separator 6 with the opposite plate 2.

Symbol E indicates a plate group block assembling means formed of a rotary element 13 having a plurality of buckets 14 moving circularly as kept horizontal and a taking-out elements 15 taking out a plate group block 16 when made of a predetermined number of plate group units stacked in the bucket 14. Both elements are operatively connected with each other to assemble the plate group block 16.

Symbol F indicates a conveying means consisting of an appropriate conveyer to convey the assembled plate group block 16 to the next step.

The above described plate separating means A, separator supplying means B, separator sealing means C, plate group unit assembling means D, plate group block assembling means E and conveying means F are operated as related with one another by using a well known driving system and controlling system and are perfectly automated.

Further, the machine of the present invention as formed of a line including the plate separating means A' for the plate 2' (positive plates), separator supplying means B and separator sealing means C, another line including the plate separating means A" for the plates 2" (positive plates), separator supplying means B and separator sealing means C and still another line including the plate separating means A for the opposite plates 2 (negative plates), plate group unit assembling means, plate group block assembling means and conveying means is shown in FIG. 1. It is formed to use the negative plates which are more by one than the positive plates and to be operated advantageously at a high efficiency. However, it is not limited to such formation and the line including the plate separating means A" for the plate 2" (positive plates) and others can be omitted.

Now the operation of the machine of the present invention shall be explained in the following. First of all, when the machine is started, the rocking levers 4, 4' and 4" will rock, the separating plates 3, 3' and 3" will reciprocate and therefore the plates 2, 2' and 2" stacked in the hoppers 1, 1' and 1" will be separated one by one respectively from the lowermost parts and will be delivered forward. In such case, the plate 2 will be a negative plate and the plates 2' and 2" will be positive plates. As the stopping elements 5, 5' and 5" (such as, for example, limit switches) are provided as shown in FIG. 2 respectively in front of the hoppers 1, 1' and 1", in case any one plate is not separated, the above mentioned stopping elements 5, 5' will operate to automatically stop the operation of the entire machine.

Figure 3C:
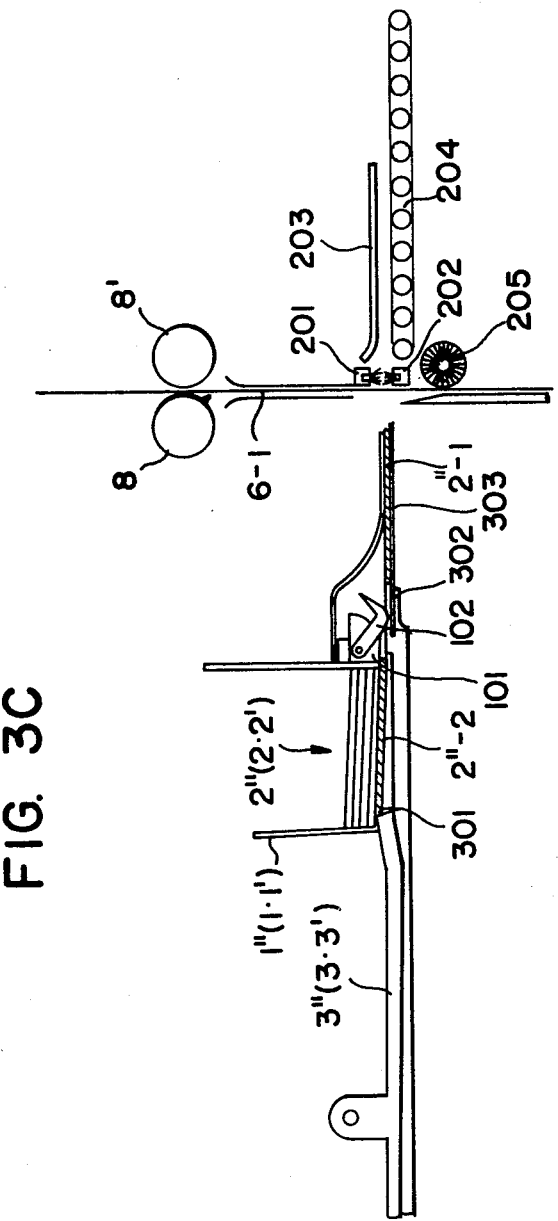
FIGS. 3C, 3D and 3E show respective steps of projecting the plate.
Figure 3D:
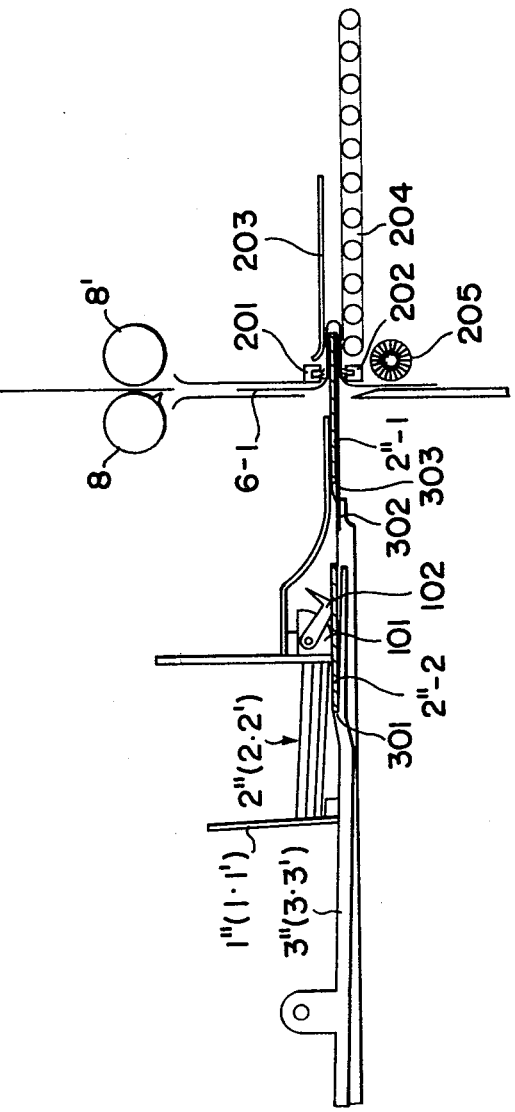
Figure 3E:
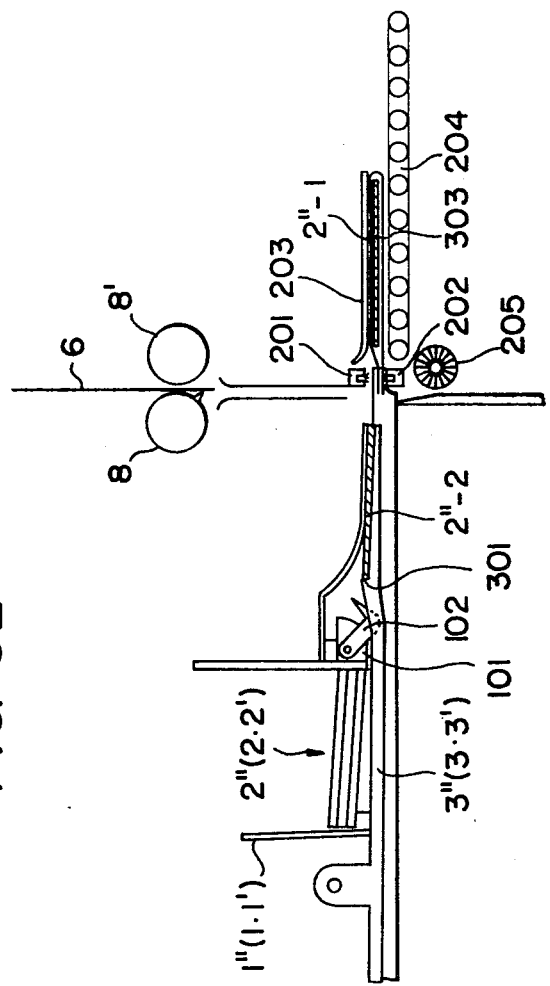

First, on the side line in FIG. 1, the separating and delivering step A" shall be explained. A plate 2"-1 is pushed out of the hopper 1" by a first step pawl 301 of the separating plate 3" and is delivered through a slit (of a clearance through which only one plate can pass) provided in the lower portion of the hopper. In such case, a stopper 102 will be pushed up by the plate 2"-1. Thereafter, by the rotation of the rocking lever 4", the separating plate 3" is retreated. At this time, the stopper 102 will stop the plate 2"-1 so as not to come back. Next, when the projecting plate 3" begins to move forward and, the same as the first operation, one plate 2"-2 is pushed out of the hopper 1" by the first step pawl 301 of the separating plate 3", meanwhile the plate 2"-1 will be mounted on a bending plate 303 fitted to the tip 302 of the separating plate 3" and will be further advanced. A separator 6-1 will lower vertically and wait in the direction in which this plate 2"-1 advances. The plate 2"-1 will be mounted on the middle portion of this separator 6-1. The bending plate 303 will contact the plate 2"-1. Then, while the plate 2"-1 is being pushed to bend the separator 6-1, the plate 2"-1 will be passed between upper and lower brushes 201 and 202, will be wrapped between a pressing plate 203 and carrying conveyer 204 and will be moved to the next step. When the separating plate 3" begins to retreat in response to the return of the lever 4", the plate 2"-2 will be stopped by the stopper 102 from returning. Thereafter, the same operation will be repeated. FIGS. 3C, 3D and 3E are detailed views showing respective steps of projecting the plate. FIG. 3C shows the plate 2"-1 about to begin to be advanced by the tip 302 of the separating plate 3". FIG. 3D shows a step wherein the plate 2"-1 contacts the separator 6-1 having lowered vertically, bends said separator and passes between the upper and lower brushes 201 and 202 and then, on the other hand, the first step pawl 301 of the separating plate 3" delivers a next plate 2"-2 out of the hopper 1". FIG. 3E shows a step wherein, when the plate 2"-1 is wrapped between the pressing plate 203 and bending plate 103 by the separator 6-1 and then the bending plate 103 is returned by the return of the lever 4", the plate 2"-1 wrapped with the separator 6-1 will be conveyed to the next step by the next transferring element 10" by a roller conveyer 204. The middle line is the same separating step as the side line except that there is no separator wrapping step and no separator sealing step. The separator delivering step shall be explained in the following. As shown in FIG. 2, the separator 6 is rolled as a sheet on a delivering roller, 401, passes through transferring rollers 402 and 402' and guide rollers 403 and 404 and are moved in the vertical direction from the horizontal direction to make a step B. That is to say, the separator further moved downward by a pair of transferring rollers 7 and 7' will pass between the roll cutters 8 and 8' and will be slitted at lengths proper to wrap the plate. These slits are provided at predetermined intervals by leaving connecting parts of about 0.2 to 0.5 mm to make it easy to cut the separator off the sheet. FIG. 4 shows the separator having roll cutter slits 6a made in it. FIG. 5 is a sectioned view of the roll cutters 8 and 8'. 8a is a cutting edge to make a slit 6a of the separator 6. 8b is a cutting edge which is to make a fold of the separator, is located symmetrically with the cutting edge 8a and is not for cutting off the separator. By the way, the separator 6-1 is so formed as to be pulled downward by a rotary brush 205. FIG. 6 is to explain in detail the mechanism of the roll cutter part. A power is transmitted through bevel gears from a driving shaft to rotate a shaft 501 and is transmitted in the horizontal direction by a gear 502 at the tip and an idler gear 503 meshed with it to rotate a gear 504 rotating the roll cutters 8 and 8' and to rotate a gear 505 rotating the transferring rollers 7 and 7'. The gear ratio of the above mentioned two gears is 2 for the transferring roller to 1 for the cutter roll. That is to say, during the operation of one cycle, the cutter roll will make one rotation and the transferring roller will make a half rotation. The cutter roller is made to make one rotation in conformity with the length of the separator of a length sufficient to wrap the plate. Then, the plate wrapped with the separator is sealed in both end portions except the upper opened portion of the separator by the sealing means C. FIG. 7 shows the plate as sealed in both end portions 6b of the separator. In FIG. 8, the sealing means C consists of a pair of heating elements containing cartridge heaters 9 and 9'. It is used to continuously or partly seal the side portions of the separator 6 coating the plates. The heating elements are so made as to be able to freely adjust the temperature in response to the variations of the material of the separator to be used and the production speed. In this embodiment, the sealing by heating has been described but the sealing with a binder can be also applied.

Figure 9A:
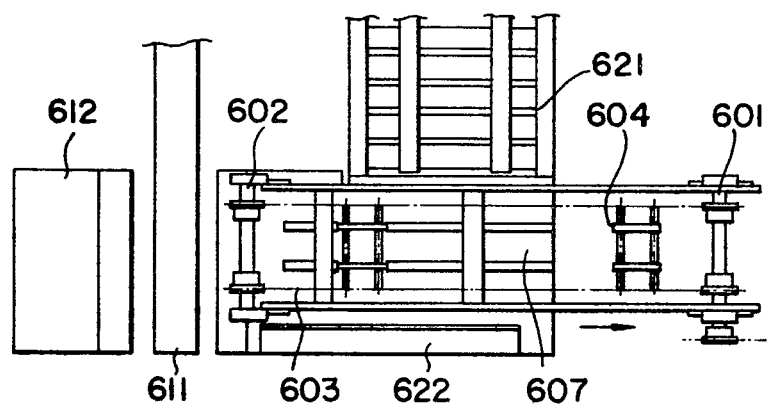
FIG. 9A shows a plan view of a pushing means (element 11').
Figure 9B:
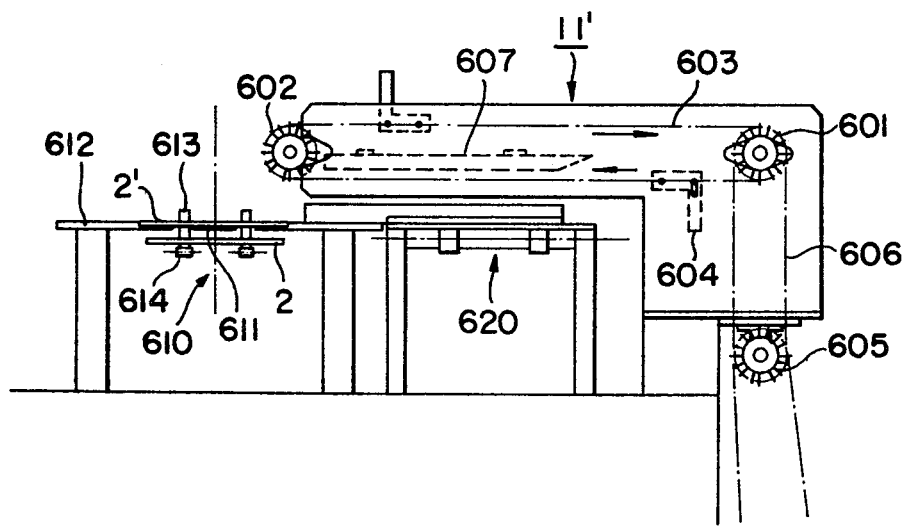
FIG. 9B is a side view of the pushing means.

Here, the plate wrapped with the separator is advanced by the transferring elements 10". Then, as shown in FIG. 1, only plates are fed from the middle line and plates wrapped with separators are fed from the side line to form a plate group unit 12. The plate laterally moving element 11' from the side line to the middle line for that purpose shall be explained. FIG. 9A shows a plan view of the laterally moving element 11' and FIG. 9B shows a side view of the same. 610 is a middle line in FIG. 1. 620 is a left side line in FIG. 1. The laterally moving element 11' is arranged above the side line 620 and is fundamentally operated by a chain 603 moving to rotate in the direction indicated by the arrow between main shafts 601 and 602. The chain 603 is provided with a pawl 604 in an appropriate place. The main shaft 601 is driven by a chain 606 from a driving shaft 605. 607 is a pawl guide. The pawl moving together with the chain passes through the groove of the guide. When the plate 2' wrapped with the separator and coming as carried by a roll conveyer 621 of the side line 620 contacts the stopper 622 and stops there, the pawl 604 provided on the chain 603 will come advancing with the rotary motion of the chain in the direction indicated by the arrow, will move the plate 2' stopping on the side line 620 in the lateral direction of the side line (that is, in the direction of the middle line 610) and will mount the plate on a bridging guide 611 above the middle line 610 and the plate 2' will stop in contact with a stopper 612. When, in the middle line, a chain 614 fitted with a hook 613 moves to advance in the direction of the main shaft and the plate 2 is mounted and conveyed by the hook and comes below the bridging guide 611, the plate 2' on the guide 611 will be caught by the hook and a unit will be formed where the bridging guide 611 is no longer and will further advance. The element 11" of the right side line 630 of the middle line 610 is also the same.

The separating speed of the plate 2 of the middle line 610 is the same speed as of the transferring element 10 (hooked chain) and the respective transferring elements 10' and 10" of the other side lines 620 and 630. The separating speeds of the plates 2' and 2" are the same and the timing is also the same. The separating speed of the plate 2 is made twice as high as the separating speed of the plate 2". The plate having passed through the station D will form a unit in which the plate 2' (positive plate) wrapped with the separator is mounted on the plate 2 (negative plate) and a unit in which the plate 2" (positive plate) wrapped with the separator is mounted on the plate 2 (negative plate). The above mentioned two units are units of the negative plate and the positive plates wrapped with the separators. Both side lines are low in the speed in order to wrap the plate with the separator, the middle line requires no means of wrapping the plate with the separator mentioned above, therefore the plate separating speed can be made high and the production speed can be elevated by mounting the wrapped plate from both sides. However, in some case, the side line may be one.

Figure 11:
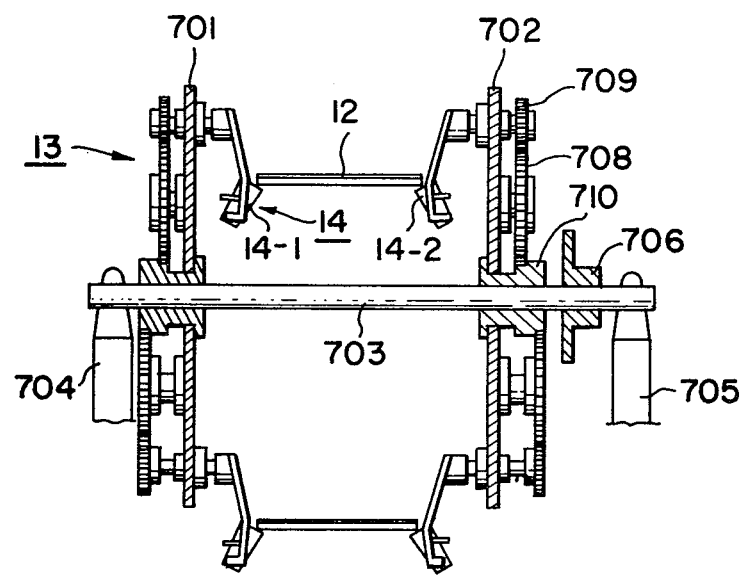
FIG. 11 is an elevation of the same.

The station E shall be explained in the following. In FIGS. 10 and 11, the rotary element 13 is so formed that two rotary disks 701 and 702 may be separated from each other at a fixed spacing and may be rotated simultaneously by a main shaft 703 which is borne by bearings 704 and 705. 706 is a driving sprocket for rotating the rotor. 707 is a driving chain connected at the other end with a driving shaft. The bucket 14 is held by a horizontal position keeping driving gear 710, an idler gear 708 and a driven gear 709 so as to always keep a horizontal position between the disks 701 and 702 of the rotor. The bucket 14 lifts the plates with hooks 14-1 and 14-2 at both ends. In this drawing, six buckets 14 are fitted.

When the plate group unit 12 coming as conveyed by the hooked chain 10 rises along an inclined guide 711 and stops away from the hook of the hooked chain, the bucket 14 will rotate and rise from below due to the rotary motion of the rotor 13 and will lift and successively carry the unit 12. The carried plate group unit will be arranged in the position by a plate group unit arranging plate 713 fitted to a frame 712 on the other side and a predetermined number of plates will be laminated on a receiving plate 714 so as to be a plate group block 16. When the predetermined number of plates are laminated, a cam 715 will rotate, the receiving plate 714 will be lowered with a shaft 717 as a fulcrum by a roller 716, the plate group block 16 will be mounted on an always moving conveying chain 718 and will be carried in the direction indicated by the arrow (station F).

Figure 12:
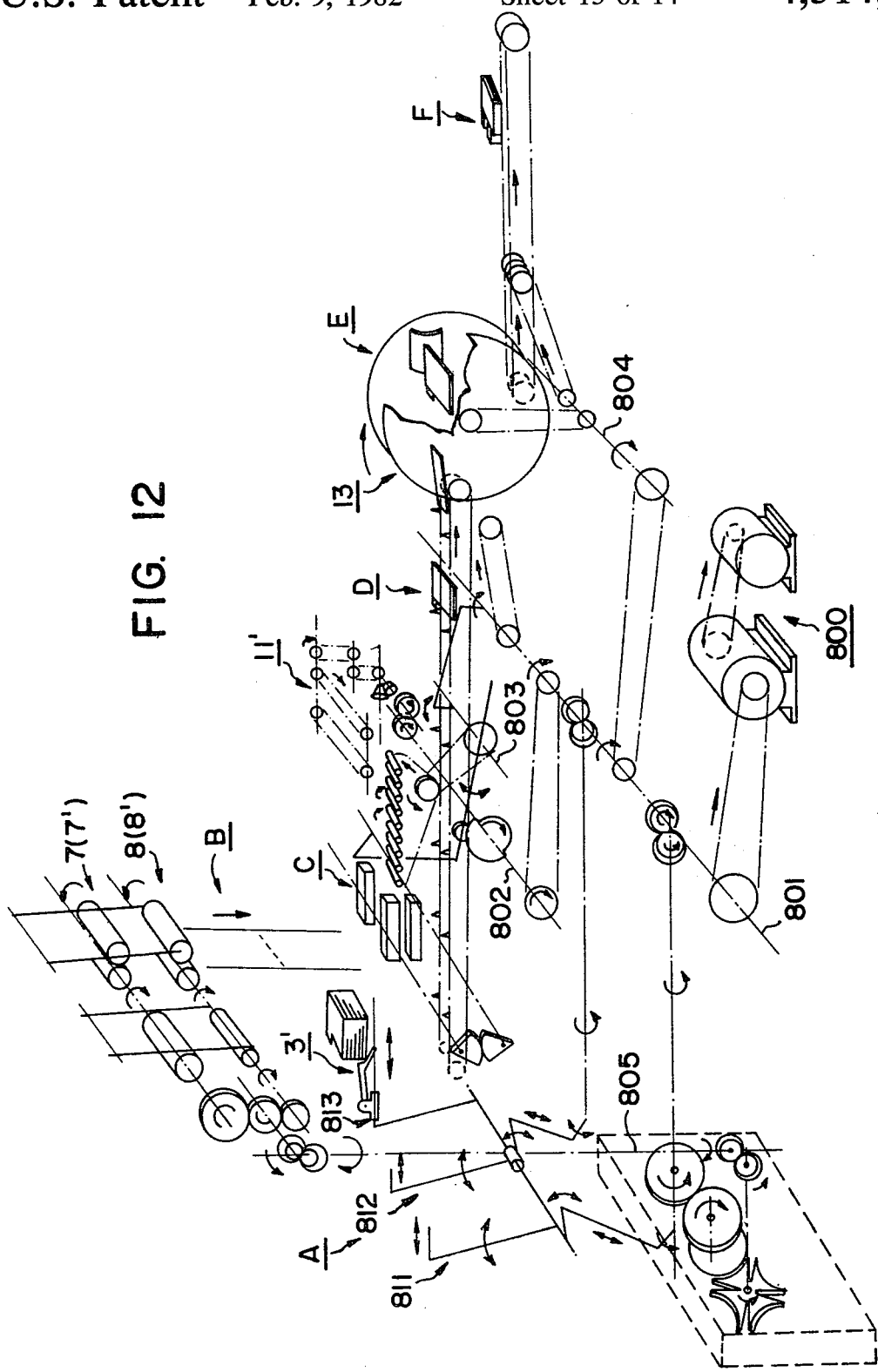
FIG. 12 is a view showing a drive transmitting mechanism of the machine of the present invention.
Figure 13:
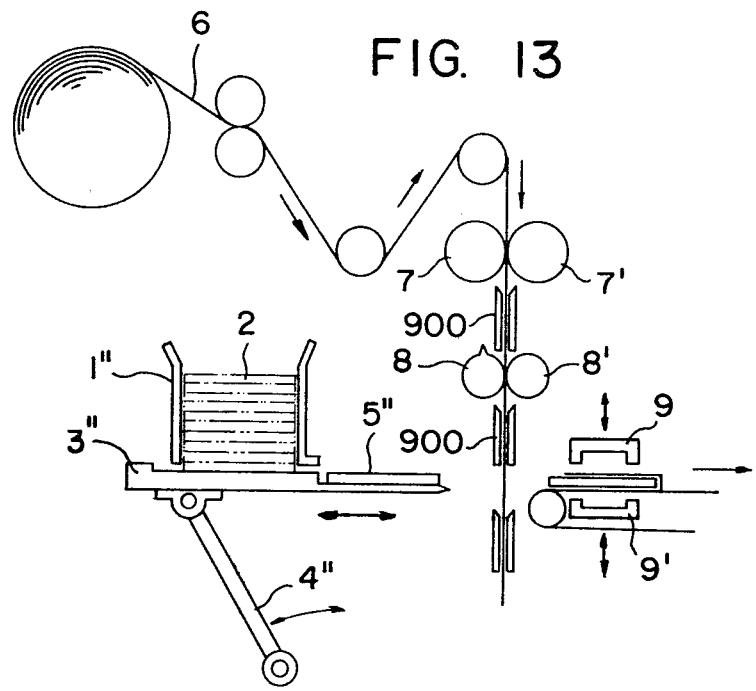
FIG. 13 is a view of an air feeder as fitted as of another modification of the present invention.
Figure 14B:
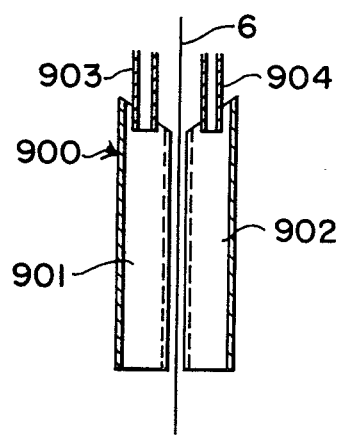
FIG. 14B is a sectional side view taken along line XIVB–XIB of FIG. 14A.
Figure 14A:
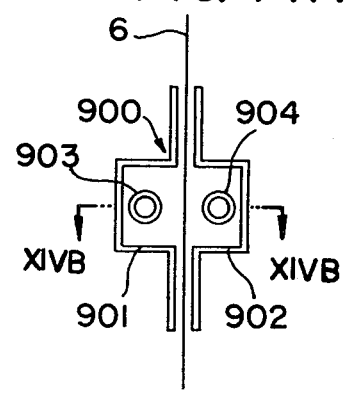
FIG. 14A shows a plan view of the air feeder as seen from above.

FIG. 12 is a view showing a drive transmitting mechanism. A power is transmitted to a main shaft 801 from a main power motor 800 and is further transmitted to respective mechanisms through gears, sprockets and chains. 811, 812 and 813 are connected respectively to plate projecting means. An auxiliary shaft 802 has the power transmitted from the main shaft 801 and is connected to the laterally moving elements 11' and 11". An auxiliary shaft 803 is connected to the laterally moving elements 10' and 10" which are intermittently operatively connected to driving sprockets fitted to the auxiliary shaft 803 by containing a one-way clutch. The power is transmitted to the middle line and both side lines from the main shaft 801. An auxiliary shaft 804 operates the rotation of the rotor 13 and the rotary motion of the conveying chain at the station F. An auxiliary shaft 805 having the power transmitted by the driving gear gives the power to the transfer of the separator and the roll cutter. FIG. 13 shows a view in which an air feeder is fitted for the fall of the separator in the vertical direction as another modification of the present invention. FIG. 14A shows a plan view of an air feeder 900 as seen from the above and FIG. 14B shows a sectioned side view taken along line XIVB—XIVB of the same. The air feeder 900 consists of a pair of groove-shaped guides 901 and 902 on both sides of the separator 6. 903 and 904 are air feeding pipes for feeding compressed air respectively into these guides 901 and 902.

There is an advantage that, when air is thus fed through the air feeding pipes, the separator will be transferred downward by this flow, will be prevented from snaking and waving in the course and will be smoothly two-folded when the separator is transferred and the plate is projected. By the way, a proper number of air feeders can be provided in proper places.

As in the above, the present invention has been explained on the basis of the embodiments. However, it is needless to say that the present invention is not limited to them but can be variously modified without departing from the spirit of the invention.

While the present invention has been described with reference to particular embodiments thereof, it will be understood that numerous modifications may be made by those skilled in the art without actually departing from the spirit and scope of the invention as defined in the appended claims.

What I claim is:

1. A machine for stacking plate groups for storage battery comprising
   (a) means for feeding separator material in a vertical direction from above by a pair of transferring rollers,
   (b) means disposed below the feeding means for cutting said separator material into separators from a continuous roll with a roll cutter having at least one cutting edge,
   (c) plate separating and delivering means disposed below the cutting means for separating and delivering one-by-one plates in a lowermost step from a hopper containing the plates with a separating plate so as to intersect at right angles with the separator transferred vertically from the transferring rollers, whereby the separator is two-folded about a plate and is cut off to predetermined dimensions with the delivered plate, said plate separating means being positioned so as deliver a plate covered with a separator to a first conveyor line
   (d) separator sealing means disposed behind the plate separating and delivering means for sealing the separator covering the plate on the sides,
   (e) a transferring element supported adjacent the separator sealing means for transferring the plate covered with the separator, from said first conveyor line to a second conveyor line, said transferring element comprising chain conveyors and laterally moving elements, said laterally movable elements being movable laterally with respect to said conveyor lines,
   (f) plate unit composing means disposed behind the transferring element wherein a line for transferring a plate of a different pole from a third conveyor line is provided in parallel with said laterally moving elements so that the covered plate may be transferred to said second conveyor line to be overlapped with the plate of the different pole to form a plate unit, said line for transferring a plate of a different pole being movable in an opposite direction to the direction of movement of said transferring element
   (g) plate block composing means and along said second conveyor disposed behind the plate unit composing means for laminating a predetermined number of plate units to be a block, and
   (h) conveying means disposed behind the plate block composing means for conveying said block to the next step.

2. A machine for stacking plate groups for storage batteries according to claim 1, wherein said roll cutter has a separator folding cutting edge in a position symmetrical with the cutting edge which cuts off the separator, said separator folding cutting edge providing a foldline in the separator.

3. A machine for stacking plate groups for storage batteries according to claim 1, wherein a rotary brush provided below the plate separating and delivering means is so formed as to pull downward separators.

4. A machine for stacking plate groups for storage batteries according to claim 1 wherein the rotation ratio of the separator to the roll cutter is made 1:½.

5. A machine for stacking plate groups for storage batteries according to claim 1 wherein an air feeder is so provided as to hold the separator on both sides when the separator vertically falls and to push the separator with the flow of air.

6. A machine for stacking plate groups for storage batteries according to claim 1 wherein several buckets are provided on a rotor for the plate block composing means so that the unit plate may be picked up by the bucket with the rotary motion of the rotor and may be mounted on a receiving plate on the other side by the rotation to compose a plate block.

* * * * *